United States Patent
Xu et al.

(10) Patent No.: US 9,665,792 B2
(45) Date of Patent: May 30, 2017

(54) METHOD AND APPARATUS FOR GENERATING SHARP IMAGE BASED ON BLURRY IMAGE

(71) Applicant: Huawei Technologies Co., Ltd., Shenzhen (CN)

(72) Inventors: Li Xu, Hong Kong (HK); Jiaya Jia, Hong Kong (HK); Kwok Wai Hung, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 14/843,147

(22) Filed: Sep. 2, 2015

(65) Prior Publication Data

US 2016/0070979 A1    Mar. 10, 2016

(30) Foreign Application Priority Data

Sep. 5, 2014 (CN) .......................... 2014 1 0450141

(51) Int. Cl.
*G06K 9/40* (2006.01)
*G06K 9/52* (2006.01)
(Continued)

(52) U.S. Cl.
CPC .................. *G06K 9/52* (2013.01); *G06T 3/40* (2013.01); *G06T 5/003* (2013.01)

(58) Field of Classification Search
CPC . G06T 5/003; G06T 3/40; G06T 2207/20201; G06K 9/52
(Continued)

(56) References Cited

U.S. PATENT DOCUMENTS 7,860,336 B2    12/2010    Bando
8,203,615 B2 *   6/2012    Wang ..................... G06T 5/003
                                                         348/208.4
(Continued)

FOREIGN PATENT DOCUMENTS

JP    2002065663 A    3/2002
JP    2007201533 A    8/2007
(Continued)

OTHER PUBLICATIONS

Perona, P., "Deformale kernels for early vision," Technical Report MIT-LIDS-P-2039, IEEE Transactions on Pattern Analysis and Machine Intelligence, vol. 17, Oct. 1991, 28 pages.
(Continued)

*Primary Examiner* — Daniel Mariam
(74) *Attorney, Agent, or Firm* — Conley Rose, P.C (57) ABSTRACT

A method for generating a sharp image based on a blurry image is provided. The method includes acquiring pixel values of pixels in the blurry image, and a convolution kernel of the blurry image, determining a deconvolution kernel of the blurry image based on a preset image gradient operator and the convolution kernel, determining pixel values of pixels in the sharp image based on the deconvolution kernel and the pixel values of the pixels in the blurry image, and generating the sharp image based on the pixel values of the pixels in the sharp image. A deconvolution kernel in the embodiments of the present disclosure is determined based on a gradient operator and a convolution kernel, in other words, the deconvolution kernel introduces the gradient operator as a regularization constraint, which prevents noise from affecting an image recovery process, and improves the quality of a recovered sharp image.

6 Claims, 3 Drawing Sheets

(51) Int. Cl.
*G06T 5/00* (2006.01)
*G06T 3/40* (2006.01)

(58) Field of Classification Search
USPC .................................... 382/255, 275, 190
See application file for complete search history.

(56) References Cited

U.S. PATENT DOCUMENTS

| | | | |
|---|---|---|---|
| 8,380,000 | B2 | 2/2013 | Lee et al. |
| 8,390,704 | B2 | 3/2013 | Wang et al. |
| 9,208,543 | B2 * | 12/2015 | Wang ...................... G06T 5/003 |
| 9,262,815 | B2 * | 2/2016 | Tezaur ...................... G06T 5/003 |
| 2011/0090352 | A1 | 4/2011 | Wang et al. |
| 2014/0160325 | A1 | 6/2014 | Hirai et al. |

FOREIGN PATENT DOCUMENTS

| | | |
|---|---|---|
| JP | 2012515970 A | 7/2012 |
| JP | 2013508811 A | 3/2013 |
| JP | 2013168779 A | 8/2013 |
| JP | 2014115790 A | 6/2014 |
| KR | 20100079658 A | 7/2010 |
| WO | 2010085249 A1 | 7/2010 |

OTHER PUBLICATIONS

Krishnan, D., et al., "Fast Image Deconvolution using Hyper-Laplacian Priors," Proc. Neural Inf. Process. Syst., vol. 1041, Dec. 6, 2010, 10 pages.
Foreign Communication From a Counterpart Application, European Application No. 15180300.4, Extended European Search Report dated Feb. 9, 2016, 8 pages.
Partial English Translation and Abstract of Japanese Patent Application No. JPA200265663, Aug. 19, 2016, 19 pages.
Partial English Translation and Abstract of Japanese Patent Application No. JPA2014115790, Aug. 19, 2016, 107 pages.
Foreign Communication From A Counterpart Application, Japanese Application No. 2015-168812, Chinese Office Action dated Jul. 19, 2016, 3 pages.
Foreign Communication From a Counterpart Application, Japanese Application No. 2015-168812, English Translation of Chinese Office Action dated Jul. 19, 2016, 3 pages.
Foreign Communication From a Counterpart Application, Korean Application No. 2015-168812, Korean Office Action dated Jul. 12, 2016, 4 pages.
Foreign Communication From a Counterpart Application, Korean Application No. 2015-168812, English Translation of Korean Office Action dated Jul. 12, 2016, 2 pages.
Xu, L., et al., "Two-Phase Kernel Estimation for Robust Motion Deblurring," ECCV 2010, Part I, LNCS 6311, Sep. 2010, pp. 157-170.
Danielyan, A., et al., "Image Deblurring by Augmented Langrangian with BM3D Frame Prior," Sep. 21, 2014, 6 pages.
Partial English Translation and Abstract of Japanese Patent Application No. JPA2012515970, Dec. 15, 2016, 24 pages.
Partial English Translation and Abstract of Japanese Patent Application No. JPA2013168779, Dec. 15, 2016, 71 pages.
Foreign Communication From a Counterpart Application, Chinese Application No. 2015168812, Chinese Office Action dated Oct. 18, 2016, 3 pages.
Foreign Communication From a Counterpart Application, Chinese Application No. 2015168812, English Translation of Chinese Office Action dated Oct. 18, 2016, 3 pages.
Foreign Communication Form A Counterpart Application, Korean Application No. 10-2015-0121593, Korean Notice of Allowance dated Jan. 6, 2017, 3 pages.

* cited by examiner

METHOD AND APPARATUS FOR GENERATING SHARP IMAGE BASED ON BLURRY IMAGE

CROSS-REFERENCE TO RELATED APPLICATIONS

This application claims priority to Chinese Patent Application No. 201410450141.3, filed on Sep. 5, 2014, which is incorporated herein by reference in its entirety.

TECHNICAL FIELD

The present disclosure relates to the field of image processing, and in particular, to a method and an apparatus for generating a sharp image based on a blurry image.

BACKGROUND

With development of computer technologies, technologies such as image denoising, enhancement, restoration, and segmentation by using a computer are widely applied.

In the field of digital images, an imaging process of a digital image is approximately modeled as a discrete convolution model, for example, a motion blur process caused by camera shake, a camera imaging defocus blur process, a low-definition image generation process, or the like. Therefore, enhancement and recovery of a digital image can be implemented by using a process inverse to the discrete convolution model, that is, a deconvolution technology. A typical deconvolution technology includes a digital image deblurring technology, an image super-resolution technology, and the like.

Wiener filtering is a classical deconvolution technology. In the Wiener filtering, a pseudo deconvolution kernel is introduced in a frequency domain, and a formula of the pseudo deconvolution kernel is as follows $$W = \frac{\overline{F(x)}}{|F(k)|^2 + \frac{1}{SNR}} \quad (1)$$

where $F(\cdot)$ represents a Fourier transform, $\overline{F(\cdot)}$ represents a complex conjugate of the Fourier transform, SNR represents a signal-to-noise power ratio (SNR), which achieves an effect of suppressing high-frequency noise of the pseudo deconvolution kernel, and k represents a convolution kernel. A sharp image may be expressed by using the following formula $$x = F^{-1}(W \cdot F(y)) \quad (2)$$

where y represents a blurry image, and $F^{-1}(\cdot)$ represents an inverse Fourier transform. By using a convolution formula of the Fourier transform, formula (2) may be converted into $$x = F^{-1}(W) = \omega * y \quad (3)$$

where $\omega$ is a deconvolution kernel in a space domain.

The introduction of the deconvolution kernel simplifies computation of a deconvolution algorithm, but the deconvolution kernel uses an SNR as a regularization constraint. Such a regularization constraint is affected by noise, so that an image recovery process using the deconvolution kernel inevitably affected by noise and a ringing effect, which damages quality of a recovered sharp image to a certain extent.

SUMMARY

Embodiments of the present disclosure provide a method and an apparatus for generating a sharp image based on a blurry image, which can improve the quality of a recovered sharp image.

According to a first aspect, a method for generating a sharp image based on a blurry image is provided, including acquiring pixel values of pixels in the blurry image, and a convolution kernel of the blurry image; determining a deconvolution kernel of the blurry image based on a preset image gradient operator and the convolution kernel; determining pixel values of pixels in the sharp image based on the deconvolution kernel and the pixel values of the pixels in the blurry image; and generating the sharp image based on the pixel values of the pixels in the sharp image.

With reference to the first aspect, in one implementation manner of the first aspect, the determining pixel values of pixels in the sharp image based on the deconvolution kernel and the pixel values of the pixels in the blurry image includes performing singular value decomposition on the deconvolution kernel, to obtain m non-zero singular values, m row vectors, and m column vectors that are in one-to-one correspondences; and determining the pixel values of the pixels in the sharp image based on the m non-zero singular values, the m row vectors, the m column vectors, and the pixel values of the pixels in the blurry image.

With reference to the first aspect or the foregoing implementation manner of the first aspect, in another implementation manner of the first aspect, the determining the pixel values of the pixels in the sharp image based on the m non-zero singular values, the m row vectors, the m column vectors, and the pixel values of the pixels in the blurry image includes determining $z_j^{t+1}$ based on a formula $z_j^{t+1} = \arg\min_z E(x^t, z_j, \gamma_j^t)$; determining $x^{t+1}$ based on a formula $$x^{t+1} = \sum_{l=1}^{m} s_l \cdot a * f_u^l * f_v^l;$$

determining $\gamma_j^{t+1}$ based on a formula $\gamma_j^{t+1} = \gamma_j^t - \beta(z_j^{t+1} - c_j * x^{t+1})$; and when t reaches a preset quantity of iterations, determining the pixel values of the pixels in the sharp image based on $x^{t+1}$; or when t does not reach the quantity of iterations, updating $\gamma_j^t$ by using $\gamma_j^{t+1}$, updating $x^t$ by using $x^{t+1}$, and performing this step repeatedly until t reaches the quantity of iterations, where $$E(x^t, z_j, \gamma_j^t) = \sum_{i=1}^{n} \left( \frac{\lambda}{2}(x^t * k - y)_i^2 + \sum_{j=1}^{2} |z_j|_i^\alpha + \sum_{j=1}^{2} \frac{\beta}{2}(z_j - c_j * x^t)_i^2 - \langle \gamma_j^t, (z_j - c_j * x^t) \rangle_i \right),$$

and $$a = \sum_{j=1}^{2} c_j' * \left( z_j^{t+1} - \frac{1}{\beta}\gamma_j^t \right) + \frac{\lambda}{\beta} k' * y,$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1=0$, $s_l$ represents the $l^{th}$ singular value in the m non-zero singular values, $f_u^l$ represents a column vector corresponding to the $l^{th}$ singular value, $f_v^l$ represents a row vector corresponding to the $l^{th}$ singular value, $c_j'$ and k' respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

With reference to the first aspect or either of the foregoing implementation manners of the first aspect, in another implementation manner of the first aspect, the determining pixel values of pixels in the sharp image based on the deconvolution kernel and the pixel values of the pixels in the blurry image includes determining $z_j^{t+1}$ based on a formula $z_j^{t+1}=\arg\min_z E(x^t,z_j,\beta^t)$ determining $x^{t+1}$ based on a formula $$x^{t+1} = \omega_\beta * \left( \sum_{j=1}^{2} c_j' * \left( z_j - \frac{1}{\beta}\gamma_j \right) + \frac{\lambda}{\beta} k' * y \right);$$

determining $\beta^{t+1}$ based on a formula $\beta^{t+1}=2\beta^t$; and when t reaches a preset quantity of iterations, determining the pixel values of the pixels in the sharp image based on $x^{t+1}$; or when t does not reach the quantity of iterations, updating $\gamma_j^t$ by using $\gamma_j^{t+1}$, updating $x^t$ by using $x^{t+1}$, and performing this step repeatedly until t reaches the quantity of iterations, where $$E(x^t, z_j, \beta^t) = \sum_{i=1}^{n} \left( \frac{\lambda}{2}(x^t*k - y)_i^2 + \sum_{j=1}^{2} \frac{\beta^t}{2}(z_j - c_j*x^t)_i^2 + |z_j|_i^\alpha \right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_1$, $c_j'$ and k' respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

With reference to the first aspect or any one of the foregoing implementation manners of the first aspect, in another implementation manner of the first aspect, the determining pixel values of pixels in the sharp image based on the deconvolution kernel and the pixel values of the pixels in the blurry image includes determining $z_j^{t+1}$ based on a formula $z_j^{t+1}=\arg\min_z E(x^t,z_j,\gamma_j^t)$; determining $x^{t+1}$ based on a formula $$x^{t+1} = \omega_\beta * \left( \sum_{j=1}^{2} c_j' * \left( z_j - \frac{1}{\beta}\gamma_j \right) + \frac{\lambda}{\beta} k' * y \right);$$

determining $\gamma_j^{t+1}$ based on a formula $\gamma_j^{t+1}=\gamma_j^t-\beta(z_j^{t+1}-c_j*x^{t+1})$; and when t reaches a preset quantity of iterations, determining the pixel values of the pixels in the sharp image based on $x^{t+1}$; or when t does not reach the quantity of iterations, updating by $\gamma_j^t$ by using $\gamma_j^{t+1}$, updating $x^t$ by using $x^{t+1}$, and performing this step repeatedly until t reaches the quantity of iterations, where $$E(x^t, z_j, \gamma_j^t) = \sum_{i=1}^{n} \left( \frac{\lambda}{2}(x^t*k - y)_i^2 + \sum_{j=1}^{2} |z_j|_i^\alpha + \sum_{j=1}^{2} \frac{\beta}{2}(z_j - c_j*x^t)_i^2 - \langle \gamma_j^t, (z_j - c_j*x^t) \rangle_i \right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1=0$, $c_j'$ and k' respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

With reference to the first aspect or any one of the foregoing implementation manners of the first aspect, in another implementation manner of the first aspect, the determining a deconvolution kernel of the blurry image based on a preset image gradient operator and the convolution kernel includes determining the deconvolution kernel according to a formula $$\omega_B = F^{-1}\left( \frac{1}{\sum_{j=1}^{2}|F(c_j)|^2 + \frac{\lambda}{\beta}|F(k)|^2} \right),$$

where $\omega_\beta$ represents the deconvolution kernel, $c_j$ represents the image gradient operator, where $c_j$ includes $c_1$ and $c_2$, $c_1$ represents the horizontal gradient operator, and $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform.

According to a second aspect, an apparatus for generating a sharp image based on a blurry image is provided, including an acquisition unit configured to acquire pixel values of pixels in the blurry image, and a convolution kernel of the blurry image; a first determining unit configured to determine a deconvolution kernel of the blurry image based on a preset image gradient operator and the convolution kernel acquired by the acquisition unit; a second determining unit configured to determine pixel values of pixels in the sharp image based on the deconvolution kernel determined by the first determining unit and the pixel values of the pixels in the blurry image that are acquired by the acquisition unit; and a generation unit configured to generate the sharp image based on the pixel values of the pixels in the sharp image that are determined by the second determining unit.

With reference to the second aspect, in one implementation manner of the second aspect, the second determining unit is configured to perform singular value decomposition on the deconvolution kernel, to obtain m non-zero singular values, m row vectors, and m column vectors that are in one-to-one correspondences; and determine the pixel values of the pixels in the sharp image based on the m non-zero singular values, the m row vectors, the m column vectors, and the pixel values of the pixels in the blurry image.

With reference to the second aspect or the foregoing implementation manner of the second aspect, in another implementation manner of the second aspect, the second determining unit is configured to determine $z_j^{t+1}$ based on a formula $z_j^{t+1} = \arg\min_z E(x^t, z_j, \gamma_j^t)$ determine $x^{t+1}$ based on a formula $$x^{t+1} = \sum_{l=1}^{m} s_l \cdot a * f_u^l * f_v^l;$$

determine $\gamma_j^{t+1}$ based on a formula $\gamma_j^{t+1} = \gamma_j^t - \beta(z_j^{t+1} - c_j * x^{t+1})$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \gamma_j^t) = \sum_{i=1}^{n} \left( \frac{\lambda}{2}(x^t * k - y)_i^2 + \sum_{j=1}^{2} |z_j|_i^\alpha + \sum_{j=1}^{2} \frac{\beta}{2}(z_j - c_j * x^t)_i^2 - \langle \gamma_j^t, (z_j - c_j * x^t) \rangle_i \right),$$

and $$a = \sum_{j=1}^{2} c_j' * \left( z_j^{t+1} - \frac{1}{\beta}\gamma_j^t \right) + \frac{\lambda}{\beta} k' * y,$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1 = y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1 = 0$, $s_l$ represents the $l^{th}$ singular value in the m non-zero singular values, $f_u^l$ represents a column vector corresponding to the $l^{th}$ singular value, $f_v^l$ represents a row vector corresponding to the $l^{th}$ singular value, $c_j'$ and $k'$ respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

With reference to the second aspect or either of the foregoing implementation manners of the second aspect, in another implementation manner of the second aspect, the second determining unit is configured to determine $z_j^{t+1}$ based on a formula $z_j^{t+1} = \arg\min_z E(x^t, z_j, \beta^t)$; determine $x^{t+1}$ based on a formula $$x^{t+1} = \omega_\beta * \left( \sum_{j=1}^{2} c_j' * \left( z_j - \frac{1}{\beta}\gamma_j \right) + \frac{\lambda}{\beta} k' * y \right);$$

determine $\beta^{t+1}$ based on a formula $\beta^{t+1} = 2\beta^t$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \beta^t) = \sum_{i=1}^{n} \left( \frac{\lambda}{2}(x^t * k - y)_i^2 + \sum_{j=1}^{2} \frac{\beta^t}{2}(z_j - c_j * x^t)_i^2 + |z_j|_i^\alpha \right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1 = y$, y represents a column vector consisting of the pixel values of the pixels in the blurry image, $z_j^{t+1}$ represents a value of the $(t+1)^{th}$ iteration of $z_j$, $c_j'$ and $k'$ respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

With reference to the second aspect or any one of the foregoing implementation manners of the second aspect, in another implementation manner of the second aspect, the second determining unit is configured to determine $z_j^{t+1}$ based on a formula $z_j^{t+1} = \arg\min_z E(x^t, z_j, \gamma_j^t)$; determine $x^{t+1}$ based on a formula $$x^{t+1} = \omega_\beta * \left( \sum_{j=1}^{2} c_j' * \left( z_j - \frac{1}{\beta}\gamma_j \right) + \frac{\lambda}{\beta} k' * y \right);$$

determine $\gamma_j^{t+1}$ based on a formula $\gamma_j^{t+1} = \gamma_j^t - \beta(z_j^{t+1} - c_j * x^{t+1})$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \gamma_j^t) = \sum_{i=1}^{n} \left( \frac{\lambda}{2}(x^t * k - y)_i^2 + \sum_{j=1}^{2} |z_j|_i^\alpha + \sum_{j=1}^{2} \frac{\beta}{2}(z_j - c_j * x^t)_i^2 - \langle \gamma_j^t, (z_j - c_j * x^t) \rangle_i \right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1 = y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1 = 0$, $c_j'$, and $k'$ respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

With reference to the second aspect or any one of the foregoing implementation manners of the second aspect, in another implementation manner of the second aspect, the second determining unit is configured to determine the deconvolution kernel according to a formula $$\omega_\beta = F^{-1}\left( \frac{1}{\sum_{j=1}^{2} |F(c_j)|^2 + \frac{\lambda}{\beta}|F(k)|^2} \right),$$

where $\omega_\beta$ represents the deconvolution kernel, $c_j$ represents the image gradient operator, where $c_j$ includes $c_1$ and $c_2$, $c_1$ represents the horizontal gradient operator, and $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform.

A deconvolution kernel in the embodiments of the present disclosure is determined based on a gradient operator and a convolution kernel; in other words, the deconvolution kernel introduces the gradient operator as a regularization constraint, which prevents noise from affecting an image recovery process, and improves the quality of a recovered sharp image.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
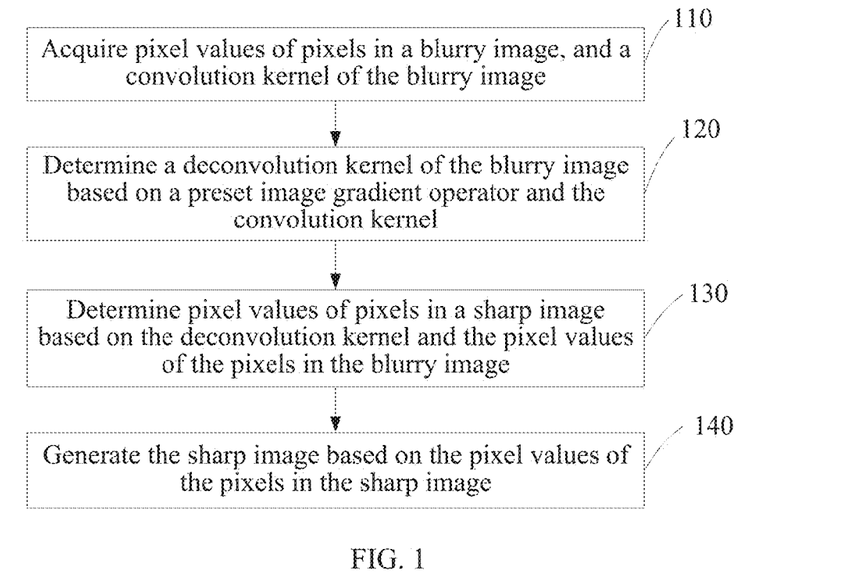
FIG. 1 is a schematic flowchart of a method for generating a sharp image based on a blurry image according to an embodiment of the present disclosure.

FIG. 1 is a schematic flowchart of a method for generating a sharp image based on a blurry image according to an embodiment of the present disclosure. The method in FIG. 1 includes 110: Acquire pixel values of pixels in the blurry image, and a convolution kernel of the blurry image.

It should be understood that, the foregoing convolution kernel is used to indicate a process in which a sharp image is converted into a blurry image.

120: Determine a deconvolution kernel of the blurry image based on a preset image gradient operator and the convolution kernel.

It should be noted that, the foregoing gradient operator may include a horizontal gradient operator and a vertical gradient operator of the image.

The foregoing step 120 may include: determining the deconvolution kernel according to a formula $$\omega_\beta = F^{-1}\left( \frac{1}{\sum_{j=1}^{2} |F(c_j)|^2 + \frac{\lambda}{\beta}|F(k)|^2} \right),$$

where $\omega_\beta$ represents the deconvolution kernel, $c_j$ represents the image gradient operator, where $c_j$ includes $c_1$ and $c_2$, $c_1$ represents the horizontal gradient operator of the image, and $c_2$ represents the vertical gradient operator of the image, k represents the convolution kernel, $\lambda$ and $\beta$ are constants, $F(\cdot)$ represents a Fourier transform, and $F^{-1}(\cdot)$ represents an inverse Fourier transform. It can be seen from the formula of the deconvolution kernel that, the deconvolution kernel $\omega_\beta$ in this embodiment of the present disclosure uses the gradient operator as a regularization constraint.

130: Determine pixel values of pixels in the sharp image based on the deconvolution kernel and the pixel values of the pixels in the blurry image.

There may be multiple determining manners in step 130, for example, the pixel values of the pixels in the sharp image are solved by minimization of an energy equation, where an energy equation that needs to be minimized may be $$E(x) = \sum_{i=1}^{n} \left( \frac{\lambda}{2}(x * k - y)_i^2 + |c_1 * x|_i^\alpha + |c_2 * x|_i^\alpha \right).$$

Step 130 will be described in detail subsequently, and details are not described herein again.

140: Generate the sharp image based on the pixel values of the pixels in the sharp image.

A deconvolution kernel in this embodiment of the present disclosure is determined based on a gradient operator and a convolution kernel; in other words, the deconvolution kernel introduces the gradient operator as a regularization constraint, which prevents noise from affecting an image recovery process, and improves the quality of a recovered sharp image.

Optionally, as an embodiment, step 130 may include performing singular value decomposition on the deconvolution kernel, to obtain m non-zero singular values, m row vectors, and m column vectors that are in one-to-one correspondences; and determining the pixel values of the pixels in the sharp image based on the m non-zero singular values, the m row vectors, the m column vectors, and the pixel values of the pixels in the blurry image.

For example, it is assumed that after the singular value decomposition is performed on the deconvolution kernel, n singular values, n row vectors, and n column vectors that are in one-to-one correspondences are obtained. A singular value, that is less than a preset threshold, in the n singular values may be deleted, and a row vector and a column vector that correspond to the deleted singular value are also deleted, to obtain the m singular values, the m row vectors, and the m column vectors that are in one-to-one correspondences.

The foregoing deconvolution kernel is a two-dimensional deconvolution kernel. By means of the foregoing singular value decomposition, the two-dimensional deconvolution kernel is decomposed into multiple one-dimensional deconvolution kernels, and because computation of the one-dimensional deconvolution kernels are relatively easy, efficiency of an algorithm is improved.

Optionally, step 130 may include determining $z_j^{t+1}$ based on a formula $z_j^{t+1}=\arg\min_z E(x^t, z_j, \gamma_j^t)$; determining $x^{t+1}$ based on a formula $$x^{t+1} = \omega_\beta * \left( \sum_{j=1}^{2} c_j' * \left( z_j - \frac{1}{\beta} \gamma_j \right) + \frac{\lambda}{\beta} k' * y \right);$$

determining $\beta^{t+1}$ based on a formula $\beta^{t+1}=2\beta^t$; and when t reaches a preset quantity of iterations, determining the pixel values of the pixels in the sharp image based on $x^{t+1}$; or when t does not reach the quantity of iterations, updating $\gamma_j^t$ by using $\gamma_j^{t+1}$, updating $x^t$ by using $x^{t+1}$, and performing this step repeatedly until t reaches the quantity of iterations, where $$E(x^t, z_j, \beta^t) = \sum_{i=1}^{n} \left( \frac{\lambda}{2} (x^t * k - y)_i^2 + \sum_{j=1}^{2} \frac{\beta^t}{2} (z_j - c_j * x^t)_i^2 + |z_j|_i^\alpha \right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $\lambda$, and $\beta$ represent weights of a polynomial, and $\alpha$ represents that a $\alpha$-norm constraint is imposed.

It should be noted that, in this embodiment of the present disclosure, the regularization constraint in the deconvolution kernel is described based on image gradient sparsity, which avoids noise interference and improves the quality of a recovered sharp image in comparison with an SNR-based regularization constraint used in Wiener filtering.

It can be seen from the foregoing embodiment that, a value of $\beta$ needs to be updated during each iteration, and because the deconvolution kernel $$\omega_\beta = F^{-1}\left( \frac{1}{\sum_{j=1}^{2} |F(c_j)|^2 + \frac{\lambda}{\beta}|F(k)|^2} \right)$$

is related to $\beta$, a value of the deconvolution kernel needs to be updated during each integration. To further improve computational efficiency, two improved embodiments are given below.

Optionally, as an embodiment, step 130 may include determining $z_j^{t+1}$ based on a formula $z_j^{t+1}=\arg\min_z E(x^t, z_j, \gamma_j^t)$; determining $x^{t+1}$ based on a formula $$x^{t+1} = \omega_\beta * \left( \sum_{j=1}^{2} c_j' * \left( z_j - \frac{1}{\beta} k' * y \right) \right);$$

determining $\gamma_j^{t+1}$ based on a formula $\gamma_j^{t+1}=\gamma_j^t-\beta(z_j^{t+1}-c_j^* x^{t+1})$; and when t reaches a preset quantity of iterations, determining the pixel values of the pixels in the sharp image based on $x^{t+1}$; or when t does not reach the quantity of iterations, updating $\gamma_j^t$ by using $\gamma_j^{t+1}$, updating $x^t$ by using $x^{t+1}$, and performing this step repeatedly until t reaches the quantity of iterations, where $$E(x^t, z_j, \gamma_j^t) = \sum_{i=1}^{n} \left( \frac{\lambda}{2}(x^t * k - y)_i^2 + \sum_{j=1}^{2} |z_j|_i^\alpha + \sum_{j=1}^{2} \frac{\beta}{2}(z_j - c_j * x^t)_i^2 - \langle \gamma_j^t, (z_j - c_j * x^t) \rangle_i \right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)$ iteration of $\gamma_j$, an initial value of $\gamma_j$ is $\gamma_j^1=0$, $\lambda$ and $\beta$ represent weights of a polynomial, and $\alpha$ represents that a $\alpha$-norm constraint is imposed.

It should be noted that, $$E(x, z_j, \gamma_j) = \sum_{i=1}^{n} \left( \frac{\lambda}{2}(x*k - y)_i^2 + \sum_{j=1}^{2} |z_j|_i^\alpha + \sum_{j=1}^{2} \frac{\beta}{2}(z_j - c_j*x)_i^2 - \langle \gamma_j, (z_j - c_j*x) \rangle_i \right),$$

is an equation obtained by decomposing the energy equation $$E(x) = \sum_{i=1}^{n} \left( \frac{\lambda}{2}(x*k - y)_i^2 + |c_1*x|_i^\alpha + |c_2*x|_i^\alpha \right)$$

by using an augmented Lagrangian method. The use of the augmented Lagrangian method makes it unnecessary to update $\beta$ in a whole iteration process, and in this case, it is also unnecessary to update the deconvolution kernel $$\omega_\beta = F^{-1}\left( \frac{1}{\sum_{j=1}^{2} |F(c_j)|^2 + \frac{\lambda}{\beta}|F(k)|^2} \right),$$

thereby further improving efficiency of an algorithm.

It should be noted that, $\langle \gamma_j, (z_j - c_j*x) \rangle$ represents a dot product of a vector $\gamma_j$ and a vector $(z_j - c_j*x)$.

Optionally, as an embodiment, step 130 may include determining $z_j^{t+1}$ based on a formula $z_j^{t+1} = \arg\min_z E(x^t, z_j, \gamma_j^t)$; determining $x^{t+1}$ based on a formula $$x^{t+1} = \sum_{l=1}^{m} s_l \cdot a * f_u^l * f_v^l;$$

determining $\gamma_j^{t+1}$ based on a formula $\gamma_j^{t+1} + \gamma_j^{t+1} - \beta(z_j^{t+1} - c_j*x^{t+1})$; and when t reaches a preset quantity of iterations, determining the pixel values of the pixels in the sharp image based on $x^{t+1}$; or when t does not reach the quantity of iterations, updating $\gamma_j^t$ by using $\gamma_j^{t+1}$, updating $x^t$ by using $x^{t+1}$, and performing this step repeatedly until t reaches the quantity of iterations, where $$E(x^t, z_j, \gamma_j^t) = \sum_{i=1}^{n} \left( \frac{\lambda}{2}(x^t*k - y)_i^2 + \sum_{j=1}^{2} |z_j|_i^\alpha + \sum_{j=1}^{2} \frac{\beta}{2}(z_j - c_j*x^t)_i^2 - \langle \gamma_j^t, (z_j - c_j*x^t) \rangle_i \right),$$

and $$a = \sum_{j=1}^{2} c_j' * \left( z_j^{t+1} - \frac{1}{\beta}\gamma_j^t \right) + \frac{\lambda}{\beta} k' * y,$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1 = y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1 = 0$, $s_l$ represents the $l^{th}$ singular value in the m non-zero singular values, $f_u^l$ represents a column vector corresponding to the $l^{th}$ singular value, $f_v^l$ represents a row vector corresponding to the $l^{th}$ singular value, $\lambda$ and $\beta$ represent weights of a polynomial, and $\alpha$ represents that a $\alpha$-norm constraint is imposed.

Figure 2:
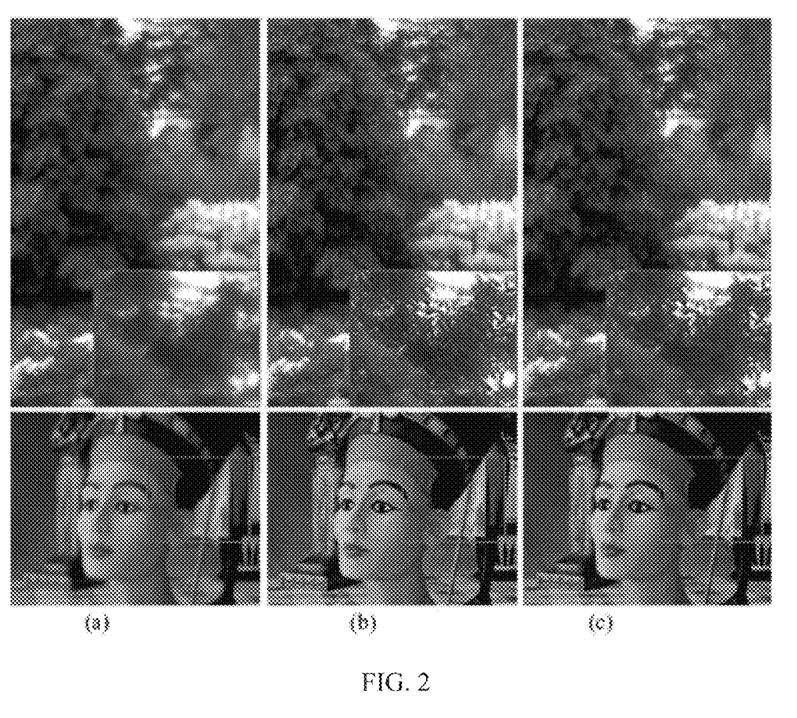
FIG. 2 is a diagram showing an effect of applying a method for generating a sharp image based on a blurry image in an embodiment of the present disclosure.

FIG. 2 is a diagram showing an effect of applying the method of this embodiment of the present disclosure. (a) in FIG. 2 is an input image, (b) is a result after the image is processed by using the method of this embodiment of the present disclosure, and (c) is a result after the input image is processed by using an existing Penalty Decomposition (PD)-based algorithm. It is easy to find after comprehensive comparison that the method of this embodiment of the present disclosure has a better effect on processing a blurry image.

The method for generating a sharp image based on a blurry image according to this embodiment of the present disclosure is described in detail above with reference to FIG. 1, and an apparatus for generating a sharp image based on a blurry image according to an embodiment of the present disclosure is described below with reference to FIG. 3 to FIG. 4.

Figure 3:
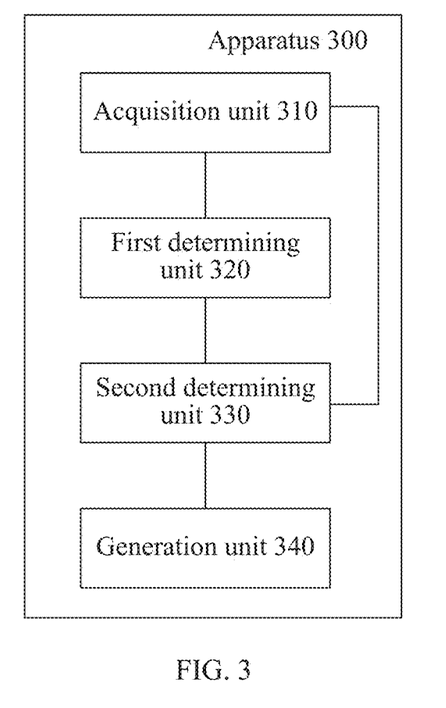
FIG. 3 is a schematic structural diagram of an apparatus for generating a sharp image based on a blurry image according to an embodiment of the present disclosure.
Figure 4:
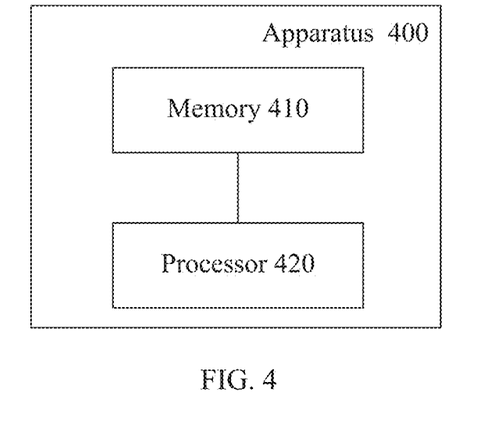
FIG. 4 is a schematic structural diagram of an apparatus for generating a sharp image based on a blurry image according to an embodiment of the present disclosure.

It should be understood that, apparatuses in FIG. 3 and FIG. 4 can implement steps of the method in FIG. 1, and for brevity, details are not described herein again.

FIG. 3 is a schematic block diagram of an apparatus for generating a sharp image based on a blurry image. An apparatus 300 in FIG. 3 includes an acquisition unit 310 configured to acquire pixel values of pixels in the blurry image, and a convolution kernel of the blurry image, a first determining unit 320 configured to determine a deconvolution kernel of the blurry image based on a preset image gradient operator and the convolution kernel acquired by the acquisition unit 310, a second determining unit 330 configured to determine pixel values of pixels in the sharp image based on the deconvolution kernel determined by the first determining unit 320 and the pixel values of the pixels in the blurry image that are acquired by the acquisition unit 310, and a generation unit 340 configured to generate the sharp image based on the pixel values of the pixels in the sharp image that are determined by the second determining unit 330.

A deconvolution kernel in this embodiment of the present disclosure is determined based on a gradient operator and a convolution kernel; in other words, the deconvolution kernel introduces the gradient operator as a regularization constraint, which prevents noise from affecting an image recovery process, and improves the quality of a recovered sharp image.

Optionally, as an embodiment, the second determining unit 330 is configured to perform singular value decomposition on the deconvolution kernel, to obtain m non-zero singular values, m row vectors, and m column vectors that are in one-to-one correspondences; and determine the pixel values of the pixels in the sharp image based on the m non-zero singular values, the m row vectors, the m column vectors, and the pixel values of the pixels in the blurry image.

Optionally, as an embodiment, the second determining unit 330 is configured to determine $z_j^{t+1}$ based on a formula $z_j^{t+1} = \arg\min_z E(x^t, z_j, \gamma_j^t)$; determine $x^{t+1}$ based on a formula $$x^{t+1} = \sum_{l=1}^{m} s_l \cdot a * f_u^l * f_v^l;$$

determine $\gamma_j^{t+1}$ based on a formula $\gamma_j^{t+1}=\gamma_j^t-\beta(z_j^{t+1}-c_j^*x^{t+1})$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \gamma_j^t) = \sum_{i=1}^{n}\left(\frac{\lambda}{2}(x^t * k - y)_i^2 + \sum_{j=1}^{2}|z_j|_i^\alpha + \sum_{j=1}^{2}\frac{\beta}{2}(z_j - c_j * x^t)_i^2 - \langle \gamma_j^t, (z_j - c_j * x^t)\rangle_i\right),$$

and $$a = \sum_{j=1}^{2} c_j' * \left(z_j^{t+1} - \frac{1}{\beta}\gamma_j^t\right) + \frac{\lambda}{\beta}k' * y,$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1=0$, $s_l$ represents the $l^{th}$ singular value in the m non-zero singular values, $f_u^l$ represents a column vector corresponding to the $l^{th}$ singular value, $f_v^l$ represents a row vector corresponding to the $l^{th}$ singular value, $c_j'$ and k' respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

Optionally, as an embodiment, the second determining unit 330 is configured to determine $z_j^{t+1}$ based on a formula $z_j^{t+1}=\arg\min_z E(x^t,z_j,\gamma_j^t)$; determine $x^{t+1}$ based on a formula $$x^{t+1} = \omega_\beta * \left(\sum_{j=1}^{2} c_j' * \left(z_j - \frac{1}{\beta}\gamma_j\right) + \frac{\lambda}{\beta}k' * y\right);$$

determine $\beta^{t+1}$ based on a formula $\beta^{t+1}=2\beta^t$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \beta^t) = \sum_{i=1}^{n}\left(\frac{\lambda}{2}(x^t * k - y)_i^2 + \sum_{j=1}^{2}\frac{\beta^t}{2}(z_j - c_j * x^t)_i^2 + |z_j|_i^\alpha\right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $c_j'$ and k' respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

Optionally, as an embodiment, the second determining unit 330 is configured to determine $z_j^{t+1}$ based on a formula $z_j^{t+1}=\arg\min_z E(x^t,z_j,\gamma_j^t)$; determine $x^{t+1}$ based on a formula $$x^{t+1} = \omega_\beta * \left(\sum_{j=1}^{2} c_j' * \left(z_j - \frac{1}{\beta}\gamma_j\right) + \frac{\lambda}{\beta}k' * y\right);$$

determine $\gamma_j^{t+1}$ based on a formula $\gamma_j^{t+1}=\gamma_j^t-\beta(z_j^{t+1}-c_j^*x^{t+1})$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \gamma_j^t) = \sum_{i=1}^{n}\left(\frac{\lambda}{2}(x^t * k - y)_i^2 + \sum_{j=1}^{2}|z_j|_i^\alpha + \sum_{j=1}^{2}\frac{\beta}{2}(z_j - c_j * x^t)_i^2 - \langle \gamma_j^t, (z_j - c_j * x^t)\rangle_i\right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $\gamma_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1=0$, $c_j'$ and k' respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

Optionally, as an embodiment, the first determining unit 320 is configured to determine the deconvolution kernel according to a formula $$\omega_\beta = F^{-1}\left(\frac{1}{\sum_{j=1}^{2}|F(c_j)|^2 + \frac{\lambda}{\beta}|F(k)|^2}\right),$$

where $\omega_\beta$ represents the deconvolution kernel, $c_j$ represents the image gradient operator, where $c_j$ includes $c_1$ and $c_2$, $c_1$ represents the horizontal gradient operator, and $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform.

FIG. 4 is a schematic block diagram of an apparatus for generating a sharp image based on a blurry image. The apparatus 400 of FIG. 4 includes a memory 410 configured to store a program, and a processor 420 configured to execute the program, where when the program is executed, the processor 420 is configured to acquire pixel values of pixels in the blurry image, and a convolution kernel of the blurry image; determine a deconvolution kernel of the blurry image based on a preset image gradient operator and the convolution kernel; determine pixel values of pixels in the sharp image based on the deconvolution kernel and the pixel values of the pixels in the blurry image; and generate the sharp image based on the pixel values of the pixels in the sharp image.

A deconvolution kernel in this embodiment of the present disclosure is determined based on a gradient operator and a convolution kernel; in other words, the deconvolution kernel introduces the gradient operator as a regularization constraint, which prevents noise from affecting an image recovery process, and improves the quality of a recovered sharp image.

Optionally, as an embodiment, the processor 420 is configured to perform singular value decomposition on the deconvolution kernel, to obtain m non-zero singular values, m row vectors, and m column vectors that are in one-to-one correspondences; and determine the pixel values of the pixels in the sharp image based on the m non-zero singular values, the m row vectors, the m column vectors, and the pixel values of the pixels in the blurry image.

Optionally, as an embodiment, the processor 420 is configured to determine $z_j^{t+1}$ based on a formula $z_j^{t+1}=\arg\min_z E(x^t, z_j, \gamma_j^t)$; determine $x^{t+1}$ based on a formula $$x^{t+1} = \sum_{l=1}^{m} s_l \cdot a * f_u^l * f_v^l;$$

determine $\gamma_j^{t+1}$ based on a formula $\gamma_j^{t+1}=\gamma_j^t - \beta(z_j^{t+1} - c_j * x^{t+1})$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \gamma_j^t) = \sum_{i=1}^{n}\left(\frac{\lambda}{2}(x^t * k - y)_i^2 + \right.$$

$$\left. \sum_{j=1}^{2}|z_j|_i^\alpha + \sum_{j=1}^{2}\frac{\beta}{2}(z_j - c_j * x^t)_i^2 - \langle \gamma_j^t, (z_j - c_j * x^t)\rangle_i \right),$$

and $$a = \sum_{j=1}^{2} c_j' * \left(z_j^{t+1} - \frac{1}{\beta}\gamma_j^t\right) + \frac{\lambda}{\beta}k' * y,$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1=0$, $s_l$ represents the $l^{th}$ singular value in the m non-zero singular values, $f_u^l$ represents a column vector corresponding to the $l^{th}$ singular value, $f_v^l$ represents a row vector corresponding to the $l^{th}$ singular value, $c_j'$ and $k'$ respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

Optionally, as an embodiment, the processor 420 is configured to determine $z_j^{t+1}$ based on a formula $z_j^{t+1}=\arg\min_z E(x^t, z_j, \gamma_j^t)$; determine $x^{t+1}$ based on a formula $$x^{t+1} = \omega_\beta * \left(\sum_{j=1}^{2} c_j' * \left(z_j - \frac{1}{\beta}\gamma_j\right) + \frac{\lambda}{\beta}k' * y\right);$$

determine $\beta^{t+1}$ based on a formula $\beta^{t+1}=2\beta^t$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$; update $x^t$ by using $x^{t+1}$, and perform this step repeatedly until t reaches the quantity of iterations, where $$E(x^t, z_j, \beta^t) = \sum_{i=1}^{n}\left(\frac{\lambda}{2}(x^t * k - y)_i^2 + \sum_{j=1}^{2}\frac{\beta^t}{2}(z_j - c_j * x^t)_i^2 + |z_j|_i^\alpha\right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $z_j^{t+1}$ represents a value of the $(t+1)^{th}$ iteration of $z_j$, $c_j'$ and $k'$ respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

Optionally, as an embodiment, the processor 420 is configured to determine $z_j^{t+1}$ based on a formula $z_j^{t+1}=\arg\min_z E(x^t,z_j,\gamma_j^t)$; determine $x^{t+1}$ based on a formula $$x^{t+1} = \omega_\beta * \left( \sum_{j=1}^{2} c'_j * \left(z_j - \frac{1}{\beta}\gamma_j\right) + \frac{\lambda}{\beta}k' * y \right);$$

determine $\gamma_j^{t+1}$ based on a formula $\gamma_j^{t+1}=\gamma_j^t-\beta(z_j^{t+1}-c_j*x^{t+1})$; and when t reaches a preset quantity of iterations, determine the pixel values of the pixels in the sharp image based on $x^{t+1}$; or when t does not reach the quantity of iterations, update $\gamma_j^t$ by using $\gamma_j^{t+1}$, update $x^t$ by using $x^{t+1}$, and perform this step repeatedly until t reaches the quantity of iterations, where $$E(x^t, z_j, \gamma_j^t) = \sum_{i=1}^{n} \left( \frac{\lambda}{2}(x^t * k - y)_i^2 + \sum_{j=1}^{2}|z_j|_i^\alpha + \sum_{j=1}^{2}\frac{\beta}{2}(z_j - c_j * x^t)_i^2 - \langle \gamma_j^t, (z_j - c_j * x^t)\rangle_i \right),$$

where n represents a quantity of the pixels in the blurry image, t represents a quantity of iterations, x represents a column vector consisting of the pixel values of the pixels in the sharp image, $x^t$ represents a value of the $t^{th}$ iteration of x, $x^{t+1}$ represents a value of the $(t+1)^{th}$ iteration of x, an initial value of x is $x^1=y$, y represents a column vector consisting of the pixel values of the pixels in the blurry image, $\gamma_j^{t+1}$ represents a value of the $(t+1)^{th}$ iteration of $z_j$, $\gamma_j^t$ represents a value of the $t^{th}$ iteration of $\gamma_j$, $\gamma_j^{t+1}$ represents a value of the $(t+1)^{th}$ iteration of $\gamma_j$, an initial value of $\gamma_j$ is $\gamma_j^1=0$, $c'_j$, and k' respectively represent operators obtained after $c_j$ and k are rotated 180 degrees, $c_j$ represents the image gradient operator, where $c_j$ includes $c_1$ and $c_2$, $c_1$ represents a horizontal gradient operator, and $c_2$ represents a vertical gradient operator, k represents the convolution kernel, $\lambda$ and $\beta$ represent weights of a polynomial, and $\alpha$ represents that a $\alpha$-norm constraint is imposed.

Optionally, as an embodiment, the processor 420 is configured to determine the deconvolution kernel according to a formula $$\omega_\beta = F^{-1}\left( \frac{1}{\sum_{j=1}^{2}|F(c_j)|^2 + \frac{\lambda}{\beta}|F(k)|^2} \right),$$

where $\omega_\beta$ represents the deconvolution kernel, $c_j$ represents the image gradient operator, where $c_j$ includes $c_1$ and $c_2$, $c_1$ represents the horizontal gradient operator, and $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform.

It should be understood that, the term "and/or" in the embodiments of the present disclosure describes only an association for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for generating a sharp image based on a blurry image, comprising:
  acquiring pixel values of pixels in the blurry image and a convolution kernel of the blurry image;
  determining a deconvolution kernel of the blurry image based on a preset image gradient operator and the convolution kernel;
  determining pixel values of pixels in the sharp image based on the deconvolution kernel and the pixel values of the pixels in the blurry image; and
  generating the sharp image based on the pixel values of the pixels in the sharp image,
  wherein determining the deconvolution kernel of the blurry image based on the preset image gradient operator and the convolution kernel comprises determining the deconvolution kernel according to a formula:

$$\omega_\beta = F^{-1}\left(\frac{1}{\sum_{j=1}^{2} |F(c_j)|^2 + \frac{\lambda}{\beta}|F(k)|^2}\right),$$

wherein $\omega_\beta$ represents the deconvolution kernel, $c_j$ represents the image gradient operator, $c_j$ comprises $c_1$ and $c_2$, $c_1$ represents the horizontal gradient operator, $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform, and
  wherein determining the pixel values of the pixels in the sharp image based on the deconvolution kernel and the pixel values of the pixels in the blurry image comprises:
    performing singular value decomposition on the deconvolution kernel, to obtain:
      in non-zero singular values;
      m row vectors; and
      m column vectors that are in one-to-one correspondences; and
    determining the pixel values of the pixels in the sharp image based on:
      the m non-zero singular values;
      the m row vectors;
      the m column vectors; and
      the pixel values of the pixels in the blurry image.

2. The method according to claim 1, wherein determining the pixel values of the pixels in the sharp image based on the m non-zero singular values, the m row vectors, the m column vectors, and the pixel values of the pixels in the blurry image comprises:
  determining $z_j^{t+1}$ based on a formula $z_j^{t+1} = \arg\min_z E(x^t, z_j, \gamma_j^t)$;
  determining $x^{t+1}$ based on a formula $$x^{t+1} = \sum_{l=1}^{m} s_l \cdot a * f_u^l * f_v^l;$$

determining $\gamma_j^{t+1}$ based on a formula $\gamma_j^{t+1} = \gamma_j^t - \beta(z_j^{t+1} - c_j * x^{t+1})$;
  determining the pixel values of the pixels in the sharp image based on $x^{t+1}$ when t reaches a preset quantity of iterations; updating $x^t$ by using $x^{t+1}$ and $\gamma_j^t$ by using $\gamma_j^{t+1}$ when t does not reach the preset quantity of iterations; and
  calculating $E(x^t, z_j, \gamma_j^t)$ and $a$ repeatedly until t reaches the preset quantity of iterations,
  wherein $$E(x^t, z_j, \gamma_j^t) = \sum_{i=1}^{n} \left(\frac{\lambda}{2}(x^t * k - y)_i^2 + \sum_{j=1}^{2} |z_j|_i^\alpha + \sum_{j=1}^{2} \frac{\beta}{2}(z_j - c_j * x^t)_i^2 - \langle \gamma_j^t, (z_j - c_j * x^t)\rangle_i\right),$$

$$\text{and } a = \sum_{j=1}^{2} c_j' * \left(z_j^{t+1} - \frac{1}{\beta}\gamma_j^t\right) + \frac{\lambda}{\beta}k' * y,$$

wherein n represents a quantity of the pixels in the blurry image,
  wherein t represents a quantity of iterations,
  wherein x represents a column vector consisting of the pixel values of the pixels in the sharp image,
  wherein $x^t$ represents a value of the tth iteration of x,
  wherein $x^{t+1}$ represents a value of the (t+1)th iteration of x,
  wherein an initial value of x is $x^1 = y$,
  wherein y represents a column vector consisting of the pixel values of the pixels in the blurry image,
  wherein $z_j^{t+1}$ represents a value of the (t+1)th iteration of $z_j$,
  wherein $\gamma_j^t$ represents a value of the tth iteration of $\gamma_j$,
  wherein $\gamma_j^{t+1}$ represents a value of the (t+1)th iteration of $\gamma_j$,
  wherein an initial value of $\gamma_j$ is $\gamma_j^t = 0$,
  wherein $s_l$ represents the lth singular value in the m non-zero singular values,
  wherein $f_u^l$ represents a column vector corresponding to the lth singular value,
  wherein $f_v^l$ represents a row vector corresponding to the lth singular value,
  wherein $c_j'$ and $k'$ respectively represent operators obtained after $c_j$ and k are rotated 180 degrees,
  wherein $c_j$ represents the image gradient operator,
  wherein $c_j$ comprises $c_1$ and $c_2$,
  wherein $c_1$ represents a horizontal gradient operator,
  wherein $c_2$ represents a vertical gradient operator,
  wherein k represents the convolution kernel,
  wherein $\lambda$ and $\beta$ represent weights of a polynomial, and
  wherein $\alpha$ represents that a $\alpha$-norm constraint is imposed.

3. An apparatus for generating a sharp image based on a blurry image, comprising:
  a non-transitory computer readable medium having instructions stored thereon; and
  a computer processor coupled to the non-transitory computer readable medium and configured to execute the instructions to:

acquire pixel values of pixels in the blurry image and a convolution kernel of the blurry image;
determine a deconvolution kernel of the blurry image based on a preset image gradient operator and the convolution kernel;
determine the pixel values of the pixels in the sharp image based on the deconvolution kernel and the pixel values of the pixels in the blurry image; and
generate the sharp image based on the pixel values of the pixels in the sharp image,
wherein the computer processor is configured to determine the deconvolution kernel according to a formula:

$$\omega_\beta = F^{-1}\left(\frac{1}{\sum_{j=1}^{2}|F(c_j)|^2 + \frac{\lambda}{\beta}|F(k)|^2}\right),$$

wherein $\omega_\beta$ represents the deconvolution kernel, $c_j$ represents the image gradient operator, $c_j$ comprises $c_1$ and $c_2$, $c_1$ represents the horizontal gradient operator, $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform,
wherein the computer processor is further configured to execute the instructions to:
  perform singular value decomposition on the deconvolution kernel, to obtain;
    m non-zero singular values;
    m row vectors; and
    m column vectors that are in one-to-one correspondences; and
  determine the pixel values of the pixels in the sharp image based on:
    the m non-zero singular values;
    the m row vectors;
    the m column vectors; and
    the pixel values of the pixels in the blurry image.

4. The apparatus according to claim 3, wherein the computer processor is further configured to execute the instructions to:
determining $z_j^{t+1}$ based on a formula $z_j^{t+1} = \arg\min_z E(x^t, z_j, \gamma_j^t)$;
determining $x^{t+1}$ based on a formula $$x^{t+1} = \sum_{l=1}^{m} s_l \cdot a * f_u^l * f_v^l;$$

determining $\gamma_j^{t+1}$ based on a formula $\gamma_j^{t+1} = \gamma_j^t - \beta(z_j^{t+1} - c_j * x^{t+1})$;
determining the pixel values of the pixels in the sharp image based on $x^{t+1}$ when t reaches a preset quantity of iterations;
updating $\gamma_j^t$ by using $\gamma_j^{t+1}$ and $x^t$ by using $x^{t+1}$ when t does not reach the preset quantity of iterations; and
calculate $E(x^t, z_j, \gamma_j^t)$ and a repeatedly until t reaches the preset quantity of iterations,
wherein $$E(x^t, z_j, \gamma_j^t) = \sum_{i=1}^{n}\left(\frac{\lambda}{2}(x^t * k - y)_i^2 + \sum_{j=1}^{2}|z_j|_i^\alpha + \sum_{j=1}^{2}\frac{\beta}{2}(z_j - c_j * x^t)_i^2 - \langle \gamma_j^t, (z_j - c_j * x^t)\rangle_i\right),$$

and $a = \sum_{j=1}^{2} c_j' * \left(z_j^{t+1} - \frac{1}{\beta}\gamma_j^t\right) + \frac{\lambda}{\beta} k' * y,$ wherein n represents a quantity of the pixels in the blurry image,
wherein t represents a quantity of iterations,
wherein x represents a column vector consisting of the pixel values of the pixels in the sharp image,
wherein $x^t$ represents a value of the $t^{th}$ iteration of x,
wherein $x^{t+1}$ represents a value of the $(t+1)^{th}$ iteration of x,
wherein an initial value of x is $x^1 = y$,
wherein y represents a column vector consisting of the pixel values of the pixels in the blurry image,
wherein $z_j^{t+1}$ represents a value of the $(t+1)^{th}$ iteration of $z_j$,
wherein $\gamma_j^t$ represents a value of the $t^{th}$ iteration of $\gamma_j$,
wherein $\gamma_j^{t+1}$ represents a value of the $(t+1)^{th}$ iteration of $\gamma_j$,
wherein an initial value of $\gamma_j$ is $\gamma_j^t = 0$,
wherein $s_l$ represents the $l^{th}$ singular value in the m non-zero singular values,
wherein $f_u^l$ represents a column vector corresponding to the $l^{th}$ singular value,
wherein $f_v^l$ represents a row vector corresponding to the $l^{th}$ singular value,
wherein $c_j'$ and $k'$ respectively represent operators obtained after $c_j$ and k are rotated 180 degrees,
wherein $c_j$ represents the image gradient operator,
wherein $c_j$ comprises $c_1$ and $c_2$,
wherein $c_1$ represents a horizontal gradient operator,
wherein $c_2$ represents a vertical gradient operator,
wherein k represents the convolution kernel,
wherein $\lambda$ and $\beta$ represent weights of a polynomial, and
wherein $\alpha$ represents that a $\alpha$-norm constraint is imposed.

5. An apparatus for generating a sharp image based on a blurry image, comprising:
a non-transitory computer readable medium having instructions stored thereon; and
a computer processor coupled to the non-transitory computer readable medium and configured to execute the instructions to:
  acquire pixel values of pixels in the blurry image and a convolution kernel of the blurry image;
  determine a deconvolution kernel of the blurry image based on a preset image gradient operator and the convolution kernel;
  determine the pixel values of the pixels in the sharp image based on the deconvolution kernel and the pixel values of the pixels in the blurry image; and
  generate the sharp image based on the pixel values of the pixels in the sharp image,
wherein the computer processor is configured to determine the deconvolution kernel according to a formula:

$$\omega_\beta = F^{-1}\left(\frac{1}{\sum_{j=1}^{2}|F(c_j)|^2 + \frac{\lambda}{\beta}|F(k)|^2}\right),$$

wherein $\omega_\beta$ represents the deconvolution kernel, $c_j$ represents the image gradient operator, $c_j$ comprises $c_1$ and $c_2$, $c_1$ represents the horizontal gradient operator, $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform, wherein the computer processor is further configured to execute the instructions to:

determining $z_j^{t+1}$ based on a formula $z_j^{t+1}=\arg\min_z E(x^t,z_j,\beta^t)$;

determining $x^{t+1}$ based on a formula $$x^{t+1} = \omega_\beta * \left( \sum_{j=1}^{2} c_j' * \left(z_j - \frac{1}{\beta}\gamma_j\right) + \frac{\lambda}{\beta} k' * y \right);$$

determining $\beta^{t+1}$ based on a formula $\beta^{t+1}=2\beta^t$;

determining the pixel values of the pixels in the sharp image based on $x^{t+1}$ when t reaches a preset quantity of iterations;

updating $\gamma_j^t$ by using $\gamma_j^{t+1}$ and $x^t$ by using $x^{t+1}$ when t does not reach the preset quantity of iterations; and calculate $E(x^t,z_j,\gamma_j^t)$ and $\alpha$ repeatedly until t reaches the preset quantity of iterations, wherein $$E(x^t, z_j, \gamma_j^t) = \sum_{i=1}^{n} \left( \frac{\lambda}{2}(x^t * k - y)_i^2 + \sum_{j=1}^{2} |z_j|_i^\alpha + \sum_{j=1}^{2} \frac{\beta}{2}(z_j - c_j * x^t)_i^2 - \langle \gamma_j^t, (z_j - c_j * x^t)\rangle_i \right),$$

wherein n represents a quantity of the pixels in the blurry image, wherein t represents a quantity of iterations, wherein x represents a column vector consisting of the pixel values of the pixels in the sharp image, wherein $x^t$ represents a value of the $t^{th}$ iteration of x, wherein $x^{t+1}$ represents a value of the $(t+1)^{th}$ iteration of x, wherein an initial value of x is $x^1=y$, wherein y represents a column vector consisting of the pixel values of the pixels in the blurry image, wherein $z_j^{t+1}$ represents a value of the $(t+1)^{th}$ iteration of $z_j$, wherein $c_j'$ and $k'$ respectively represent operators obtained after $c_j$ and k are rotated 180 degrees, wherein $c_j$ represents the image gradient operator, wherein $c_j$ comprises $c_1$ and $c_2$, wherein $c_1$ represents a horizontal gradient operator, wherein $c_2$ represents a vertical gradient operator, wherein k represents the convolution kernel, wherein $\lambda$ and $\beta$ represent weights of a polynomial, and wherein $\alpha$ represents that a $\alpha$-norm constraint is imposed.

6. An apparatus for generating a sharp image based on a blurry image, comprising:

a non-transitory computer readable medium having instructions stored thereon; and a computer processor coupled to the non-transitory computer readable medium and configured to execute the instructions to:

acquire pixel values of pixels in the blurry image and a convolution kernel of the blurry image;

determine a deconvolution kernel of the blurry image based on a preset image gradient operator and the convolution kernel;

determine the pixel values of the pixels in the sharp image based on the deconvolution kernel and the pixel values of the pixels in the blurry image; and generate the sharp image based on the pixel values of the pixels in the sharp image, wherein the computer processor is configured to determine the deconvolution kernel according to a formula;

$$\omega_\beta = F^{-1}\left( \frac{1}{\sum_{j=1}^{2} |F(c_j)|^2 + \frac{\lambda}{\beta}|F(k)|^2} \right),$$

wherein $\omega_\beta$ represents the deconvolution kernel, $c_j$ represents the image gradient operator, $c_j$ comprises $c_1$ and $c_2$, $c_1$ represents the horizontal gradient operator, $c_2$ represents the vertical gradient operator, k represents the convolution kernel, $\lambda$ and $\beta$ are constants, $F(\cdot)$ represents a Fourier transform, and $F^{-1}(\cdot)$ represents an inverse Fourier transform, wherein the computer processor is further configured to execute the instructions to:

determining $z_j^{t+1}$ based on a formula $z_j^{t+1}=\arg\min_z E(x^t,z_j,\gamma_j^t)$;

determining $x^{t+1}$ based on a formula $$x^{t+1} = \omega_\beta * \left( \sum_{j=1}^{2} c_j' * \left(z_j - \frac{1}{\beta}\gamma_j\right) + \frac{\lambda}{\beta} k' * y \right);$$

determining $\gamma_j^{t+1}$ based on a formula $\gamma_j^{t+1}=\gamma_j^t-\beta(z_j^{t+1}-c_j*x^{t+1})$;

determining the pixel values of the pixels in the sharp image based on $x^{t+1}$ when t reaches a preset quantity of iterations;

updating $\gamma_j^t$ by using $\gamma_j^{t+1}$ and $x^t$ by using $x^{t+1}$ when t does not reach the preset quantity of iterations; and calculate $E(x^t,z_j,\gamma_j^t)$ and $\alpha$ repeatedly until t reaches the preset quantity of iterations, wherein $$E(x^t, z_j, \gamma_j^t) = \sum_{i=1}^{n} \left( \frac{\lambda}{2}(x^t * k - y)_i^2 + \sum_{j=1}^{2} |z_j|_i^\alpha + \sum_{j=1}^{2} \frac{\beta}{2}(z_j - c_j * x^t)_i^2 - \langle \gamma_j^t, (z_j - c_j * x^t)\rangle_i \right),$$

wherein n represents a quantity of the pixels in the blurry image, wherein t represents a quantity of iterations, wherein x represents a column vector consisting of the pixel values of the pixels in the sharp image, wherein $x^t$ represents a value of the $t^{th}$ iteration of x, wherein $x^{t+1}$ represents a value of the $(t+1)^{th}$ iteration of x, wherein an initial value of x is $x^1=y$, wherein y represents a column vector consisting of the pixel values of the pixels in the blurry image,
wherein $z_j^{t+1}$ represents a value of the $(t+1)^{th}$ iteration of $z_j$,
wherein $\gamma_j^t$ represents a value of the $t^{th}$ iteration of $\gamma_j$,
wherein $\gamma_j^{t+1}$ represents a value of the $(t+1)^{th}$ iteration of $\gamma_j$,
wherein an initial value of $\gamma_j$ is $\gamma_j^t=0$,
wherein $c_j'$ and $k'$ respectively represent operators obtained after $c_j$ and $k$ are rotated 180 degrees,
wherein $c_j$ represents the image gradient operator,
wherein $c_j$ comprises $c_1$ and $c_2$, wherein $c_1$ represents a horizontal gradient operator,
wherein $c_2$ represents a vertical gradient operator,
wherein k represents the convolution kernel,
wherein $\lambda$ and $\beta$ represent weights of a polynomial, and
wherein $\alpha$ represents that a $\alpha$-norm constraint is imposed.

* * * * *

UNITED STATES PATENT AND TRADEMARK OFFICE
CERTIFICATE OF CORRECTION

PATENT NO. : 9,665,792 B2
APPLICATION NO. : 14/843147
DATED : May 30, 2017
INVENTOR(S) : Li Xu et al.

It is certified that error appears in the above-identified patent and that said Letters Patent is hereby corrected as shown below:

In the Claims

Column 19, Line 51, Claim 1 should read:
m non-zero singular values;

Column 23, Lines 10 thru 24, Claim 5 and Column 24, Lines 30-44, Claim 6 should read:

determine $z_j^{t+1}$ based on a formula $z_j^{t+1} = \arg\min_z E(x^t, z_j, \beta^t)$;
determine $x^{t+1}$ based on a formula $$x^{t+1} = \omega_\beta * (\sum_{j=1}^{2} c_j' * (z_j - \frac{1}{\beta}\gamma_j) + \frac{\lambda}{\beta}k' * y);$$

determine $\beta^{t+1}$ based on a formula $\beta^{t+1} = 2\beta^t$;
determine the pixel values of the pixels in the sharp image based on $x^{t+1}$ when t reaches a preset quantity of iterations;
update $\gamma_j^t$ by using $\gamma_j^{t+1}$ and $x^t$ by using $x^{t+1}$ when t Signed and Sealed this
First Day of August, 2017

Joseph Matal
*Performing the Functions and Duties of the
Under Secretary of Commerce for Intellectual Property and
Director of the United States Patent and Trademark Office*